July 14, 1942.  W. F. BERCK  2,289,867
PREDETERMINING COUNTER FOR FLUID METERS
Filed Nov. 20, 1940  3 Sheets-Sheet 1
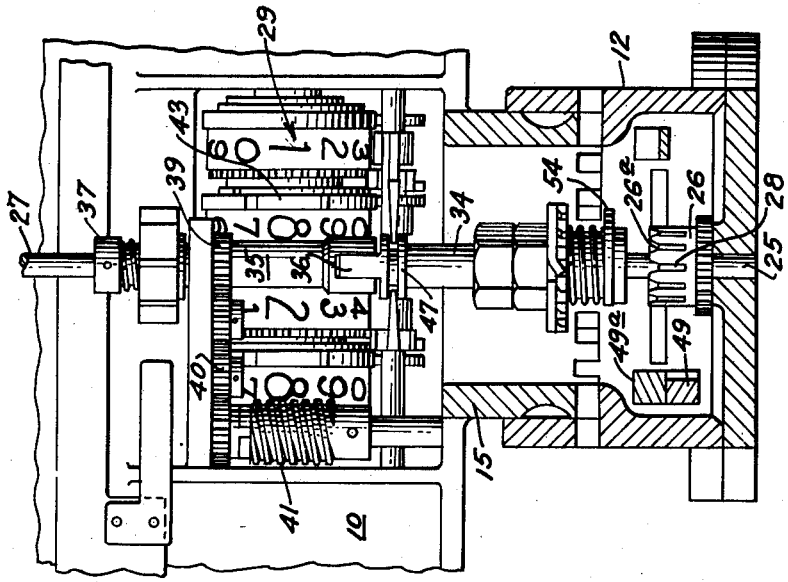
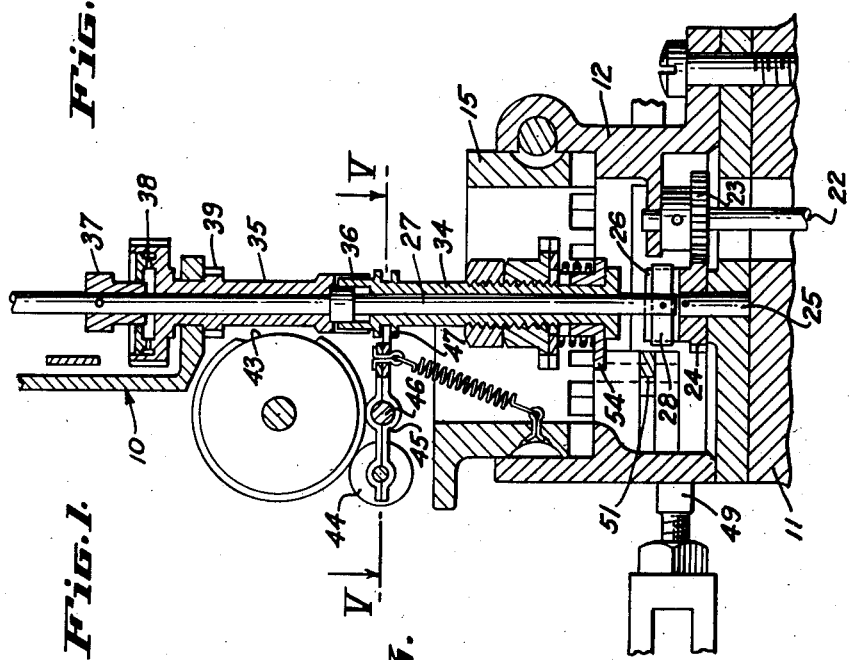
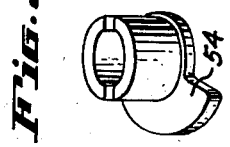
INVENTOR.
William F. Berck
BY
Oscar A. Mellin
ATTORNEY.

July 14, 1942.  W. F. BERCK  2,289,867
PREDETERMINING COUNTER FOR FLUID METERS
Filed Nov. 20, 1940   3 Sheets-Sheet 2
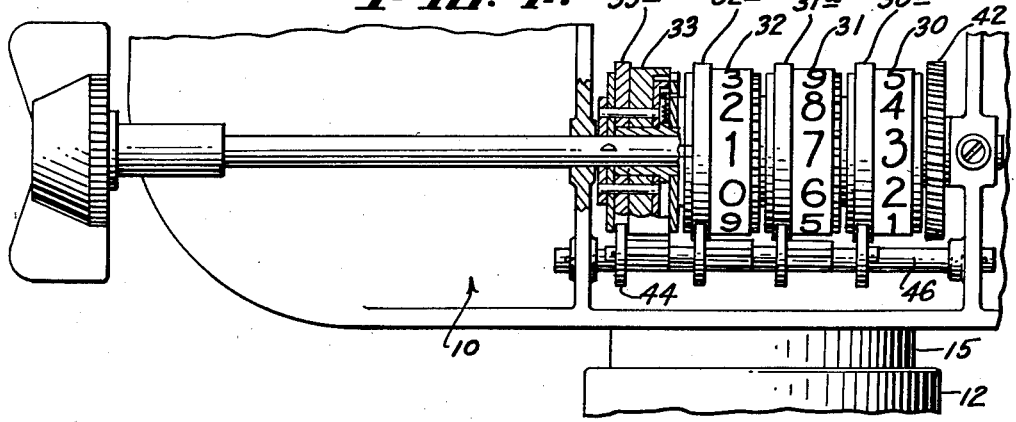
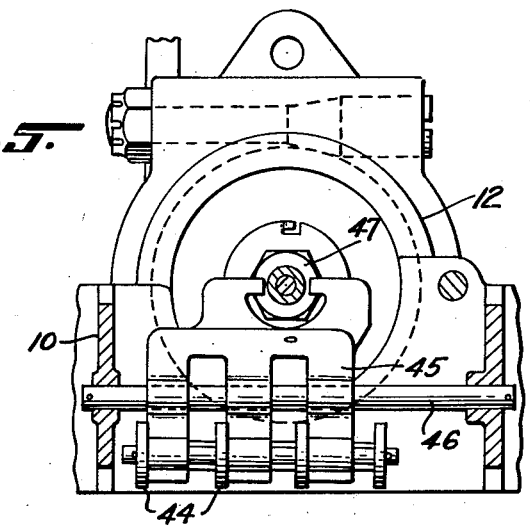
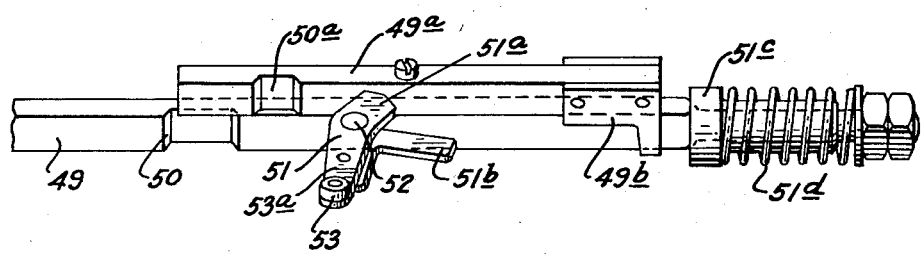
INVENTOR.
William F. Berck
BY
Oscar A. Mellin
ATTORNEY.

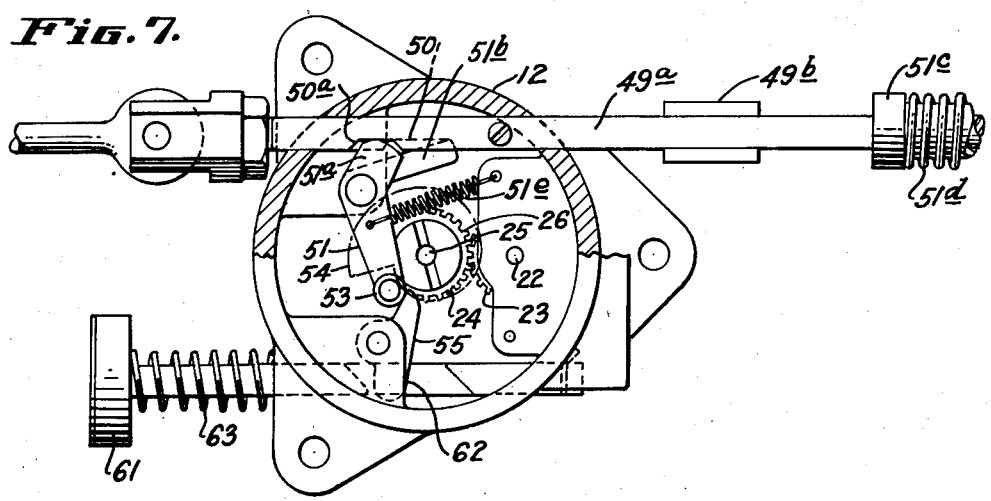
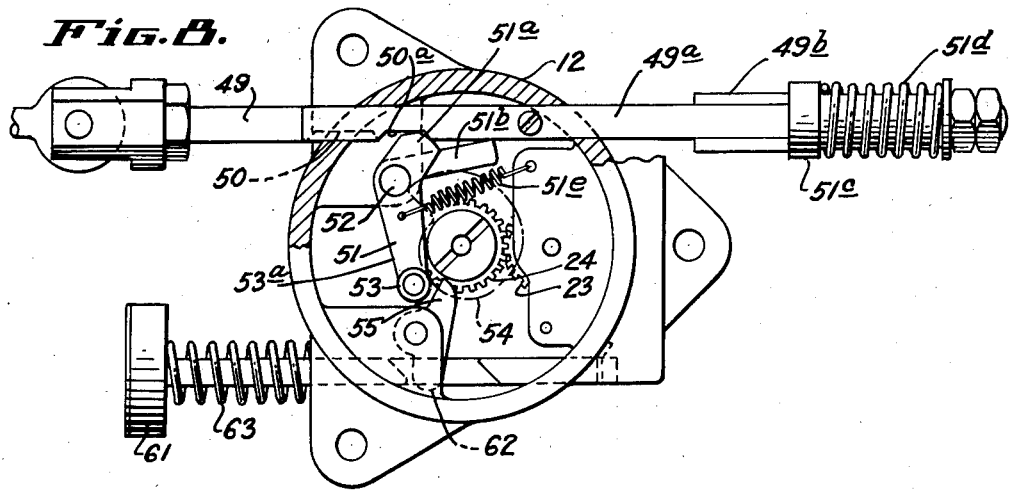
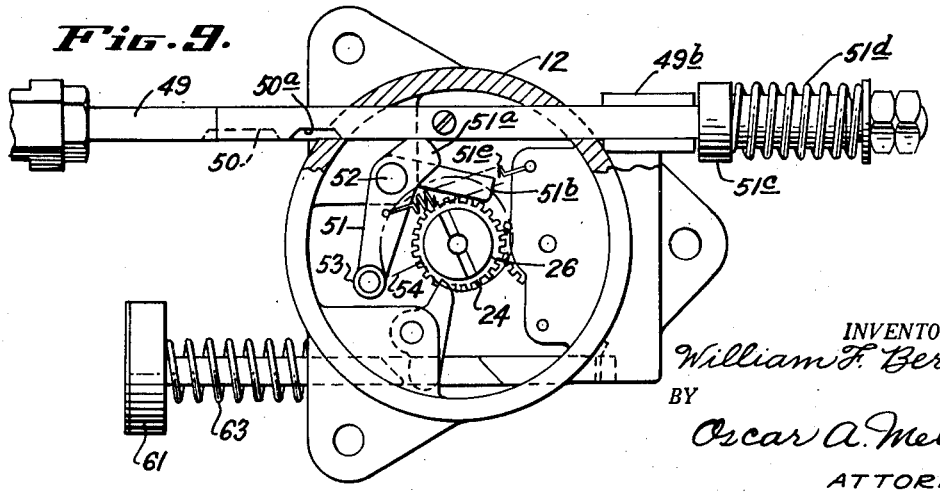

Patented July 14, 1942

2,289,867

UNITED STATES PATENT OFFICE 2,289,867

PREDETERMINING COUNTER FOR FLUID METERS

William F. Berck, Hayward, Calif., assignor to Ralph N. Brodie Company, Oakland, Calif., a corporation of California Application November 20, 1940, Serial No. 366,388

7 Claims. (Cl. 235—132)

This invention relates to shut-off devices for liquid meters and particularly pertains to an apparatus for use in connection with liquid meters which may be preset and which will operate to discontinue the meter operation automatically when the volume of liquid predetermined by the setting apparatus has passed through the meter.

It is the principal object of the present invention to provide an improved apparatus of the character referred to which will operate accurately and satisfactorily under all conditions of meter operation, and which will effect partial closing of the shut-off valve associated with the meter prior to the time when all of the liquid to be delivered has passed through the valve and then effect entire closing of the valve when the full amount of the predetermined quantity of liquid has passed through the valve, thus effecting a step by step closing of the shut-off valve to eliminate detrimental and undesirable shock or hammering in the line.

The present application is an improvement on the apparatus disclosed in my copending application entitled "Predetermining counter for fluid meters," filed June 6, 1938, and bearing Ser. No. 212,113.

One form which the invention may assume is exemplified in the following description and illustrated by way of example in the accompanying drawings, in which:

Fig. 1 is a fragmentary view in central vertical section through a fluid meter and counting mechanism disclosing my improved apparatus associated therewith.

Fig. 2 is a fragmentary view in section taken at right angles to Fig. 1 and disclosing the same mechanism.

Fig. 3 is a perspective view of the tripping cam.

Fig. 4 is a view of the revoluble tripping members and their associated counter wheels in front elevation with one of said tripping members and its associated counter wheel in section.

Fig. 5 is a plan section taken on line V—V of Fig. 1.

Fig. 6 is a fragmentary view in perspective of the auxiliary latch bar and the latching dogs shown in their correct relative positions.

Fig. 7 is a plan sectional view taken on line VII—VII of Fig. 1, showing the latching mechanism in the position which it assumes when the valve is latched in open position and the meter is in operation.

Fig. 8 is a similar view showing the latching mechanism in the position it assumes after the initial tripping operation which effects partial closing of the valve.

Fig. 9 is a similar view showing the mechanism in the position which it assumes after the final tripping operation with the valve completely closed.

Referring more particularly to the accompanying drawings, 10 indicates a counter mechanism frame for supporting a counter of the type illustrated in my copending application entitled "Counting and indicating device for fluid meters," filed April 11, 1938, and bearing Ser. No. 201,338. It is my intention to employ the apparatus disclosed in this present application in connection with the counter and indicating device disclosed in the application referred to, although I do not limit myself to such use as I am aware that my present apparatus can be used with counting and indicating mechanisms of various types and designs, or, in fact, separately from counting and indicating mechanisms of any type.

In the drawings 11 indicates a fluid meter upon which the counter mechanism frame 10 is mounted. A swivel bearing 12 is secured on the casing of the meter 11 which rotatably receives a trunnion 15 formed as an integral part of the counter frame 10. The connection between the trunnion 15 and the swivel bearing 12 is such that the former is normally relatively fixed in the bearing 12 but can be circumferentially adjusted with respect thereto. As this adjustment means forms no part of the present invention, it is not believed necessary to specifically describe the same.

The counter frame 10 carries the apparatus with which this application is particularly concerned. This apparatus is a predetermining mechanism for releasing a shut-off valve latch bar after a predetermined amount of meter operation. Mechanism of this type is disclosed in my copending application entitled "Predetermining counter for fluid meters," filed June 6, 1938, and bearing Ser. No. 212,113, and my copending application entitled "Adjustment mechanism for predetermining counter," filed August 9, 1939, and bearing Ser. No. 289,121. The mechanism is capable of being preset so that the meter operation will automatically cease after a predetermined volume of fluid has passed therethrough by the medium of closing a shut-off valve controlling the discharge port of the meter.

Referring more particularly to Fig. 1, the meter counter drive shaft is indicated by the numeral 22, which is fitted with a spur gear 23 which is in constant mesh with a spur gear 24 fixed on a stub shaft 25. At its upper end the gear 24 is provided with a relatively fixed spline clutch part 26 provided with axially extending radial slots 26a extending downwardly from its upper end. The upper ends of the slots 26a are enlarged, as illustrated in Fig. 2, to facilitate engagement of a complemental clutch blade 28 fixed at the end of a counter drive shaft 27. This shaft is journalled in the counter frame 10 and is vertically disposed in axial alignment with the stub shaft 25. It is to the lower end of this shaft 27 that the clutch blade 28 is fixed so as to engage with the slots 26a when the lower end of the shaft 27 is projected endwise into the clutch part 26 which forms a part of the gear 24.

Mounted on the counter frame 10 is a predetermining counter 29 comprising four counter wheels (see Fig. 4), a units counter wheel 30, a tens counter wheel 31, a hundreds counter wheel 32 and a thousands counter wheel 33, which are connected together by a transfer mechanism as shown in my Letters Patent of the United States No. 2,082,375, dated June 1, 1937. These counter wheels of the predetermining counter 29 may be independently set by rotation about their respective axes for predetermining the amount of liquid to be discharged through the meter before the shut-off valve is closed, the setting being accomplished in a manner and by a mechanism such as illustrated and described in my aforesaid Letters Patent of the United States. Inasmuch as the transfer mechanism between the counter wheels and the mechanism for setting the wheels constitutes no part of my present invention, it is not here disclosed in detail. While for the purpose of setting the counter wheels as just referred to I prefer to employ the type of mechanism shown in my mentioned prior patent, it is to be understood that any other setting mechanism capable of accomplishing the same purposes may be employed.

I desire to point out that when setting the predetermining counter 29, the counter wheels thereof are retrograded from zero so that the displayed numerals thereon will indicate the volume of liquid it is desired to have pass through the meter before tripping of the shut-off valve is effected. After setting and when the shut-off valve is open and the meter commences operating, the wheels will be driven in the same direction by the meter until the zero position of all the wheels is reached, at which point the tripping of the shut-off valve will be effected. In accordance with my present invention, the shut-off valve is partially closed prior to the time when the counter wheels reach the zero position and is completely closed when the wheels reach the zero position. In other words, the valve is closed in a two-step operation with a time interval between the steps so that shock and hammering in the line, which may be caused by too abruptly closing the valve, will be eliminated.

The driving of the predetermining counter is effected as follows: Referring to Figs. 1 and 2, it will be seen that two sleeves 34 and 35 are freely mounted on the counter drive shaft 27. These two sleeves are free to move axially with respect to each other to a limited extent, but are fixed against relative rotation by a slip key joint connection 36 between them. Mounted on the shaft 27 is a fixed collar 37 which is connected through the medium of a overrunning dog clutch 38 to the sleeve 35. As this latter sleeve 35 is connected to the sleeve 34, rotation of the shaft 27 will, through the medium of the collar 37 and the overrunning clutch 38, impart a drive to the sleeves 34 and 35. A spur gear 39 is fixed on the sleeve 35 which, through a chain of gears 40, imparts a drive to a worm 41 which in turn meshes with and drives a worm wheel 42 connected to the units wheel 30. The driving connection between the worm wheel 42 and said units wheel 30 is illustrated in my prior United States patent hereinbefore referred to.

It is desired to point out that each of the counter wheels 30 to 33, inclusive, is provided with a fixed trip wheel 30a, 31a, 32a and 33a. Each of these trip wheels is formed with a recess in its periphery as illustrated in Fig. 1, and indicated by the numeral 43. When the predetermining counter is is position for the final tripping of the shut-off valve, the tens, hundreds and thousands wheels will be in the zero position and the units wheel will be in the number 1 position, that is one station from zero position. At this time all of the notches or recesses 43 of all four wheels 30a to 33a, inclusive, will be in alignment and in register with rollers 44 rotatably mounted in alignment on the free end of a wide fulcrum lever 45 pivoted intermediate its ends as at 46 to the counter frame 10. The other free end of this fulcrum lever is provided with a bifurcated portion collared as at 47 to the sleeve 34, which, as will be described, conditions the trip mechanism for tripping the shut-off valve and permitting the same to close.

Referring to Figs. 1, 2 and 6 to 9, inclusive, it will be seen that extending through the fixed swivel bearing 12 is a valve rod 49 which is connected to any preferred standard type of shut-off valve, which is urged to close either by spring or by fluid pressure, or by both, so that when the valve is open, there is a constant pressure exerted on the valve rod 49 to move the same endwise in the valve closing direction. It is contemplated here to latch this valve rod 49 in a position holding the valve open, and that when the initial tripping position of the mechanism is reached, the valve rod 49 will be unlatched to enable the valve to partially close, and when the final tripping position is reached to again unlatch the valve rod 49 to enable the valve to fully close.

For this purpose the valve rod 49 is provided with a latch bar 49a which is disposed in juxtaposition to the valve rod 49 and guided in the swivel bearing 12 by a guide member 49b between it and the valve rod 49 for movement longitudinally on the valve rod 49. The valve rod 49 is provided with a latching recess 50 and the latch bar 49a is provided with a latching recess 50a. Pivotally mounted as at 52 is a latching dog 51 which is provided with two relatively fixed ends in different axial planes constituting a latching pawl 51a and a latching pawl 51b. The latching pawl 51a is adapted to cooperate with the latching recess 50a, while the latching pawl 51b is adapted to cooperate with the latching recess 50. The latching dog 51 is provided with an extending end 53a which is fitted with a cam roller 53 for engagement with the snail type of tripping cam 54 or with an auxiliary tripping dog 55.

The tripping cam 54 is normally connected with the sleeve 34 for rotation simultaneously therewith. However, when any one of the rollers 44 is not in alignment with its companion recess 43, the cam 54 is maintained in a vertical position out of register with the cam roller 53 of the latch dog 51. However, when the rollers 44 all align with their respective recesses 43 in the trip wheels, the accompanying movement of the fulcrum lever 45 moves the sleeve 34 axially downward and thereby moves the cam 54 into a registering position with the cam roller 53, and it is this action that was meant by saying "conditioning the trip mechanism for tripping the valve rod 49 and thereby enabling the shut-off valve of the meter to close."

However, it must be pointed out that the recess 43 in the trip wheel 30a of the units wheel 30 is circumferentially differently positioned with respect to the numerals on the counter wheel than are the recesses 43 on the tens, hundreds and thousands wheels. Therefore, all four of the recesses 43 will be in alignment and in register with the rollers 44 when the tens, hundreds and thousands wheels are in the zero position and when the units wheel is in the 1 station from the zero position. Thus, the tripping mechanism is conditioned for operation when the units wheel is approximately one gallon from zero position and from the point where it is desired to shut off the meter by closing the shut-off valve. The reason for this is that extreme accuracy is desired and consequently the actual tripping of the valve rod 49 is accomplished by the cam 54 moving the latch dog 51 to unlatching position, when a definite point on the cam registers with the cam roller 53.

At this point it must be pointed out, as illustrated in Figs. 7 to 9, inclusive, that the angle between the cam roller carrying portion 53a of the latch dog 51 and the pawl 51b is less than the angle between the portion 53a of the latch dog 51 and the pawl 51a, and likewise that the pawl 51b has a greater radial dimension with respect to the pivotal point than has the pawl 51a. Consequently, assuming that the parts are in the position illustrated in Fig. 7, a slight amount of movement of the tripping dog about its pivotal point, caused by the cam of the roller 53, will disengage the pawl 51b from the notch 50, while the same amount of movement is insufficient to disengage the pawl 51a from the notch 50a. Thus, the pawl 51a will still maintain the latch bar 49a from movement in a valve closing direction, but the disengagement of the pawl 51b from the notch 50 will permit the valve rod 49 to move in a valve closing direction until an abutment 51c engages the guide member 49b, which prevents the valve rod 49 from moving sufficiently to enable the shut-off valve to fully close. To cushion the shock, the abutment 51c is slightly yieldable due to the provision of a shock absorbing spring 51d.

When the tripping cam 54 is lowered into register with the cam roller 53 on the tripping dog 51, it is rapidly approaching its high point. As it continues to rotate and approach its high point, it first engages and moves the tripping dog about its axis sufficiently to disengage the pawl 51b from the notch 50 and thereby allow the shut-off valve to partially close. This occurs at approximately midway between the number 1 station on the units wheel and the zero position. As the cam and units wheel continue to rotate, the tripping dog 51 will be moved about its axis so as to disengage the pawl 51a from the notch 50a, just as the units wheel reaches the zero station. This releases the latch bar 49a so that it may move in unison with the valve rod 49 and permit the valve to fully close.

In summarizing the foregoing, it is seen that when all of the wheels, but the units wheel, have reached zero and the units wheel is at the one gallon station, the cam 54 will be lowered into register with the cam roller 53 on the tripping dog 51, and that shortly thereafter, or midway between the 1 and zero stations of the units wheel, the cam will actuate the tripping dog 51 to release the valve rod 49, but not the latching bar 49a, which will permit the valve to partially close. As the units wheel then reaches zero, the proper high point of the cam will have moved the tripping dog 51 to a point where its pawl 51a will release the latch bar 49a, thus allowing the valve to entirely close and shutting off the meter exactly at the point where the exact amount of fluid has passed through the meter and the units wheel has reached zero.

It is seen that inasmuch as the cam 54 is substantially driven directly from the meter counter drive shaft 22 and that the mechanical losses between the meter counter drive shaft 22 and the cam will be practically nil, the shut-off will occur accurately at the predetermined point.

As pointed out in my previous application first referred to herein, the exact trip-off point of the cam 54 with respect to the cam roller 53 may be adjusted. A mechanism of this character for adjustment of the cam is also disclosed in the application which I have mentioned secondly above.

In the event that it is necessary to shut the shut-off valve and stop the meter operation at any time between the commencement of delivery of fluid and before the valve is tripped by the apparatus herein disclosed, I have provided an emergency release lever 61 (see Figs. 7 to 9, inclusive). This release lever is reciprocably mounted in the swivel bearing 12 and is slotted so as to engage one end 62 of the trip dog 55. Obviously, by moving the lever in one direction against the action of the spring 63, the tripping dog 55 will be operated to engage the cam roller 53 and move the latch dog 51 to a position disengaging both of the pawls 51a and 51b from the respective notches 50a and 50 and thereby allow the valve to fully close.

In operation of the device, assuming that the mechanism is constructed in accordance with the previous description and drawings, if it is desired to discharge a given volume of fluid through the meter and to have the latter discontinue automatically when such volume has been discharged, the tripping wheels are set until their counter wheels indicate the desired volume, as previously described. At this time, of course, the shut-off valve to which the valve rod 49 is connected is closed. In opening the valve, the valve rod 49 and latch bar 49a are moved to a position where their notches 50 and 50a will be engaged by the pawls 51b and 51a. As is illustrated, the tripping dog 51 is constantly urged toward the position where the pawls 51a and 51b will engage the notches by means of a spring 51e. The meter, of course, immediately commences operation forthwith upon the opening of the shut-off valve.

As the meter operates, a drive will be transmitted from the shaft 22 to the shaft 25 and consequently to the shaft 27, which, as previously described, will drive the sleeves 34 and 35, the latter imparting a drive to the predetermining counter through the worm 41 and the worm wheel 42.

When the tens, hundreds and thousands wheels reach zero position, the recesses 43 in their tripping wheels will come into alignment with the rollers 44 on the fulcrum lever 45, but one of the rollers will still be engaged with the high point of the tripping wheel of the units wheel 30. However, when the units wheel reaches the number 1 station, which is one station from zero position, the recess 43 in its tripping wheel will align with its associated roller 44, allowing the fulcrum lever 45 to move about its pivot 46 in a direction moving the sleeve 34 downwardly and placing the cam 54 in register with the cam roller 53 on the tripping dog 51. As the cam continues to rotate and its proper circumferential position registers with the roller 53, the pawl 51b will be moved out of engagement with the recess 50, permitting the valve rod to move in a valve closing direction until the abutment 51c thereon engages the guide member 49b on the latch bar 49a. This engagement will prevent sufficient movement of the valve rod 49 to entirely close the shut-off valve. However, as the cam continues to rotate and its proper circumferential position registers with the roller 53, the pawl 51a of the tripping dog 51 will be moved out of engagement with the notch 50a, thus releasing the latch bar 49a and permitting the valve rod 49 to move in a valve closing direction sufficiently to entirely close the valve. The valve will close, of course, because of spring or fluid pressure influence, thereby shutting off the meter operation just as the exact predetermined volume has been discharged from the meter. This, of course, coincides exactly with the units wheel 30 reaching its zero position.

Thus, from the foregoing it is obvious that just prior to the time when the desired quantity of fluid is discharged through the meter, the valve is partially closed, and then at an interval of time later, when the exact quantity has been completely discharged, the valve is permitted to fully close. This step by step closing of the valve prevents shock and hammering in the line and is a very desirable feature or characteristic in mechanism of this character.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. In an apparatus of the character described, a valve rod, a latch bar, a latch member having portions to engage said rod and said bar and latch them in position, a driven rotatable member capable of operating said latch member to operate the same to successively disengage from said rod and said bar to successively release the same when said rotatable member reaches definite positions in its cycle of operation.

2. In an apparatus of the character described, a plurality of revoluble members, a valve rod, a latch bar, a latch member having a portion to engage the rod and a separate portion to engage the latch bar and latch the same in position, a driven rotatable member normally out of register with the latch member but capable when in register therewith to operate the same to successively disengage the portions thereof from the valve rod and latch bar when said rotatable member reaches definite positions in its cycle of operation, and means normally restrained by said revoluble members and automatically operative to position said rotatable member into register with said latch member when said revoluble members reach a predetermined circumferential position.

3. In an apparatus of the character described, a valve rod, a latch bar, a latch member having a pawl to engage said valve rod and latch it in position and having a pawl to engage the latch bar and latch it in position, a driven revoluble cam cooperating with the latch member and adapted to operate the same and successively disengage the pawls from the valve rod and latch bar at definite positions in the cycle of operation of said cam, there being a spaced time interval between the release of the valve rod and the release of the latch bar.

4. In an apparatus of the character described, a plurality of revoluble members, a valve rod, a latch bar associated therewith, a latch member having a pawl to engage the valve rod and a pawl to engage the latch bar and latch the same in position, a driven revoluble cam normally out of register with the latch member but capable when in register therewith to operate the same and successively disengage the pawl from the valve rod and the pawl from the latch bar when said cam reaches definite positions in its cycle of operation, and an operative connection between said cam and said revoluble members for automatically moving said cam into register with said latch member when said revoluble members reach a predetermined circumferential position.

5. In an apparatus of the character described, a valve rod, a latch bar associated for a limited amount of relative longitudinal movement, a latch member having a pawl to engage the valve rod and maintain it against movement in one direction, a second pawl on said latch member engaging said latch bar and maintain it against movement in the same direction, a driven revoluble cam cooperating with the latch member to operate the same and successively disengage the pawl from the valve rod to permit the valve rod to move relatively to the latch bar and then after a predetermined time interval disengage the pawl from the latch bar to enable the latch bar and valve rod to move in unison.

6. In an apparatus of the character described, a plurality of revoluble members capable of being set independently to a desired circumferential position, a reciprocable valve rod, a reciprocable latch bar, the valve rod being movable relative to the latch bar to a predetermined extent, a latch member having a pair of pawls one to engage the latch bar and the other to engage the valve rod and maintain them in position against movement in one direction, a drive shaft, a rotatable member mounted on said shaft to be driven therewith but axially movable on said shaft and normally positioned thereon out of register with said latch member but capable when in register therewith to operate the same when said rotatable member reaches a definite position in its cycle of rotation to successively disengage said pawls from said valve rod and latch bar, and mechanism associated with said rotatable member and with said revoluble members and capable of automatic operation when said revoluble members reach a definite circumferential position to move said rotatable member into register with the latch member.

7. In an appparatus of the character described, a plurality of revoluble members capable of being set independently to a desired circumferential position, a reciprocable valve rod, a reciprocable latch bar, a latching member operatively associated with the valve rod and the latch bar and capable of latching the same in position, a driven rotatable member normally out of register with the latching member but capable when in register therewith to operate the same to successively disengage the same from the valve rod and latch bar when said rotatable member reaches a definite position in its cycle of operation, there being an appreciable time lapse between the release of the valve rod and latch bar, and means normally restrained by said revoluble members and automatically operative to position said rotatable member into register with the latch member when said revoluble members reach a predetermined circumferential position.

WILLIAM F. BERCK.